United States Patent [19]

Citroën

[11] Patent Number: 4,701,629
[45] Date of Patent: Oct. 20, 1987

[54] SWITCH CONTROL UNIT FOR MOTOR VEHICLE

[76] Inventor: Maxime H. Citroën, 19, Villa Madrid, 92200 Neuilly-sur-Seine, France

[21] Appl. No.: 847,952

[22] Filed: Apr. 3, 1986

[30] Foreign Application Priority Data

Apr. 10, 1985 [FR] France ............................... 85 05391

[51] Int. Cl.⁴ ...................... B60K 26/00; B62D 45/00; G08G 1/00; H01H 9/00
[52] U.S. Cl. .................................. 307/10 R; 180/333; 200/52 R; 200/61.54; 340/22
[58] Field of Search ............... 180/333; 200/5 R, 6 R, 200/6 A, 61.54, 61.55–61.57, 52 R; 307/10 R; 340/22

[56] References Cited

U.S. PATENT DOCUMENTS

| | | | |
|---|---|---|---|
| 2,863,015 | 12/1958 | Ahrens | 200/61.54 |
| 3,830,991 | 8/1974 | Durocher | 200/86 R |
| 3,859,485 | 1/1975 | Blinkilde et al. | 200/85 A |
| 4,090,045 | 5/1978 | Marsh | 200/5 A |
| 4,131,772 | 12/1978 | Weckenmann et al. | 200/61.54 |
| 4,180,713 | 12/1979 | Gonzales | 200/52 R |
| 4,308,439 | 12/1981 | Itoh | 200/159 B |
| 4,454,390 | 6/1984 | Gmeiner et al. | 200/6 R X |
| 4,473,723 | 9/1984 | Suzuki | 200/6 R |
| 4,485,371 | 11/1984 | Yamada et al. | 200/61.54 X |
| 4,518,836 | 5/1985 | Wooldridge | 200/61.54 |
| 4,532,432 | 7/1985 | Mizuno et al. | 200/61.54 X |
| 4,578,592 | 3/1986 | Nakazawa et al. | 200/61.57 X |
| 4,604,912 | 8/1986 | Sugita et al. | 200/61.54 X |

FOREIGN PATENT DOCUMENTS

| | | |
|---|---|---|
| 0083701 | 7/1983 | European Pat. Off. . |
| 2805583 | 8/1979 | Fed. Rep. of Germany . |
| 2020777 | 7/1970 | France . |
| 2150941 | 4/1973 | France . |
| 2219648 | 9/1974 | France . |
| 2315408 | 1/1977 | France . |
| 2346180 | 10/1977 | France . |
| 2428315 | 1/1980 | France . |
| 2351816 | 10/1980 | France . |
| 2382349 | 8/1981 | France . |
| 2481657 | 11/1981 | France . |
| 1005743 | 9/1965 | United Kingdom ............. 200/61.54 |
| 2023938A | 1/1980 | United Kingdom ............. 200/61.54 |

*Primary Examiner*—J. R. Scott
*Attorney, Agent, or Firm*—Scully, Scott, Murphy & Presser

[57] ABSTRACT

A switch assembly for an automotive vehicle. The switch assembly comprises a support having a shape that is a reduced scale three dimensional reproduction of at least a portion of a vehicle, and the support includes a multitude of surfaces geometrically corresponding to outside surfaces of the vehicle and mutually arranged to allow tactile recognition of the surfaces of the support corresponding to surfaces of the vehicle. A plurality of switches are mounted on the support for movement between first and second states to actuate and deactuate articles of equipment on the vehicle, and each switch is positioned on the support on a location corresponding to the location on the vehicle of the article of equipment controlled by the switch.

16 Claims, 7 Drawing Figures

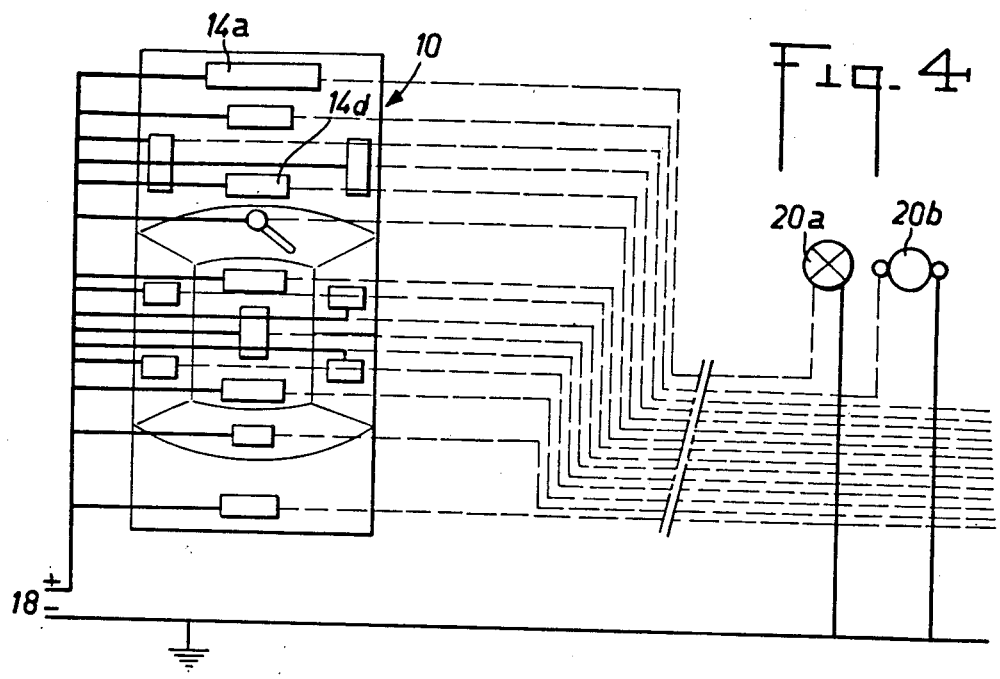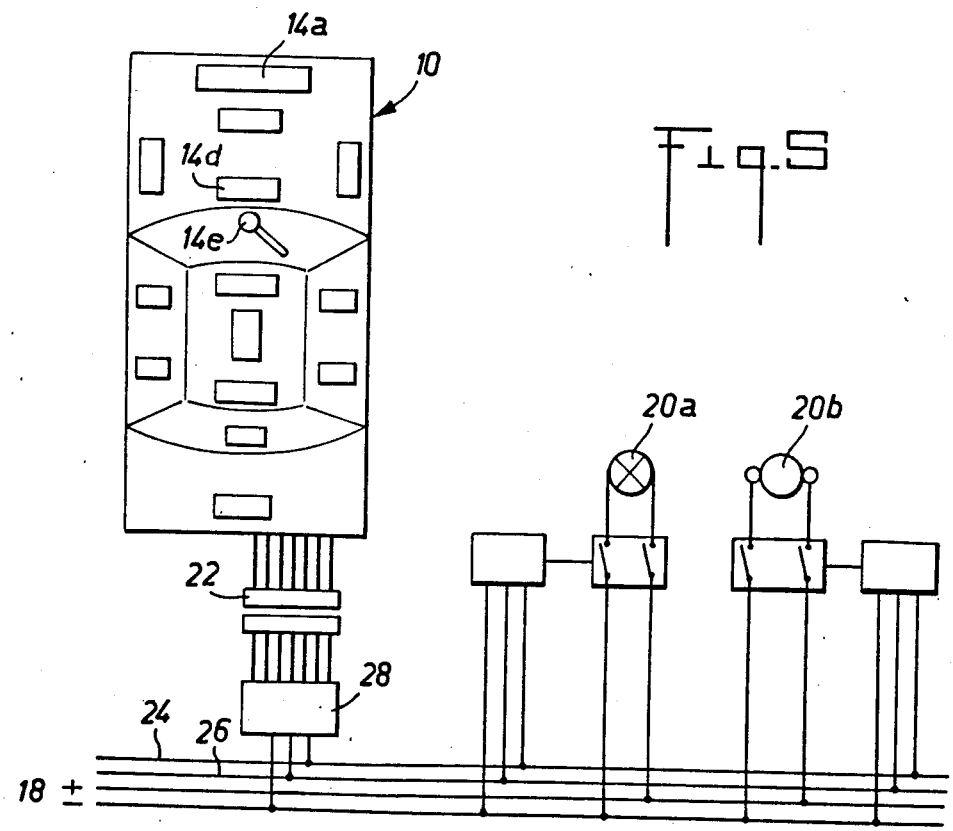

SWITCH CONTROL UNIT FOR MOTOR VEHICLE

BACKGROUND OF THE INVENTION

The present invention relates to a grouping device constituting a keyboard of control keys for equipments mounted in a motor-vehicle.

In motor-vehicles, the keys controlling the different equipments are mounted on the dashboard, or close to the steering-wheel on one or more supports and they are situated in a more or less accessible reach of the driver occupying the driving seat.

But the fact must be noted that motor-vehicle manufacturers have never agreed on a standardization of the position of the different keys to prevent drivers from being confused everytime they change vehicles.

For example, when a driver uses a new vehicle or when a a young driver drives a vehicle for the first time, he has to examine closely all the keys in order to determine what equipments they control, using as a guide the diagrams provided on the keys, or by consulting the instruction book of the vehicle.

It has been found that many drivers do not take that essential precaution, and for those who do, there is a period of adaption which may be long or short, during which, in emergencies, the driver may often hesitate and/or have inopportune reflexes.

One interesting solution has been proposed in French Patent No. 2 428 315 whereby the keys are fixed on a plane support, namely a two-dimensional support, and arranged according to a representative diagram of the vehicle, in positions similar to the positions of the controlled equipments.

The disadvantage of this solution however is the necessity for the driver to use his eyes to identify the diagram on the support and to guide the hand towards the wanted control key. This is not compatible with the safety requirement whereby the driver of a motor vehicle should keep his eyes on the road, more particularly when he is controlling equipments which are essential for the driving and/or for warning other vehicles on the road. This known apparatus therefore can only be applied to the control of equipments used when the vehicle is stationary with the exception of the control of equipments used while the vehicle is running such as indicator lights, dipped headlights, windshield wipers.

SUMMARY OF THE INVENTION

It is the object of the present invention to overcome the aforesaid disadvantages by proposing a grouping device which constitutes a panel or keyboard of keys controlling equipments mounted in a motor-vehicle, of the type comprising a support on which the control keys are mounted, wherein said support consists at least partly, in a reduced-scale three-dimensional reproduction or near-reproduction, of a vehicle, on which each control key is fixed in a place substantially corresponding to the place occupied by the equipment that it controls.

With this particular arrangement, drivers will have a device on which the keys are grouped in areas conforming to elementary logic and which they can get used to finding very rapidly without taking their eyes off the road, due to instant tactile recognition of the raised parts of the keyboard on which the keys are grouped.

BRIEF DESCRIPTION OF THE DRAWINGS

The invention will be more easily understood on reading the following description, with reference to the accompanying drawings, in which :

FIG. 4 illustrates a conventional wiring diagram with supply bundle to the equipment, FIGS. 5 and 6 illustrate wiring diagrams for multiplex supply and control installations.

DETAILED DESCRIPTION OF THE PREFERRED EMBODIMENTS

Figure 1:
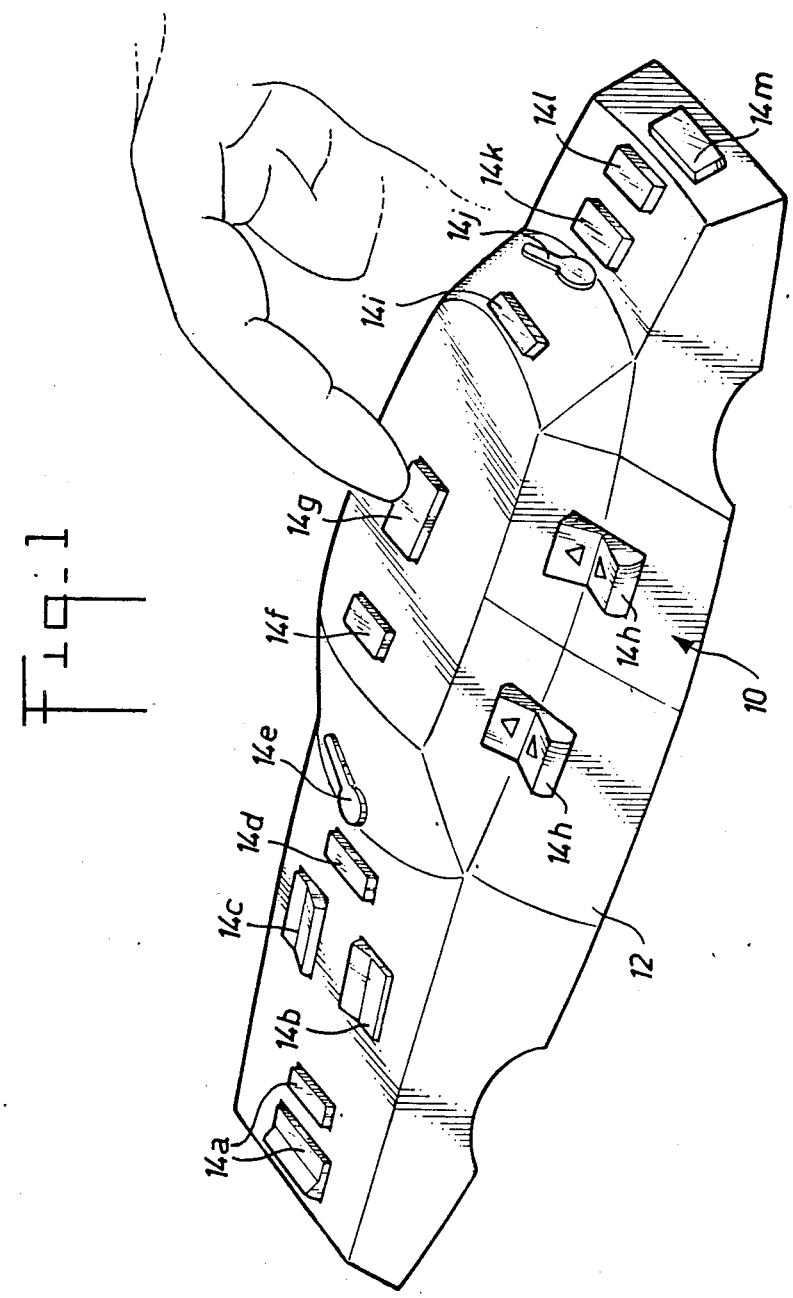
FIG. 1 is a perspective view of a device according to the invention.

Referring first to FIG. 1, the device according to the invention, shown in perspective, and called herein a keyboard, is designated as a whole by the reference 10 and comprises a support 12 which, as can be seen in the figure, when compared with the fingers of an operator's hand, is a reduced-scale three-dimensional reproduction of a motor vehicle.

On said support are placed a number of keys 14 controlling equipments mounted in a life-size motor-vehicle in which is fitted the keyboard of the present invention.

More specifically, each key is fixed on the keyboard in a part which substantially corresponds to the actual position occupied in the motor-vehicle by the equipment that it controls. For example, a key 14a is provided at the front of the bonnet of the support and controls the lights of the vehicle. Obviously, since these lights are actually split into at least three types of different lights, namely : parking lights, dipped headlights, and full headlights, said key may consist in a multiple key or in an equivalent group of keys.

At the rear part of the bonnet and on either side of the longitudinal median axis of the support are provided two operationally-coupled keys 14b and 14c controlling turn-signal lights.

As a variant, said keys may consist in a single key positioned astride the longitudinal axis of the support.

Close to the lower edge of the windshield, a press-key 14d is provided for controlling the windshield-washers.

On the windshield proper, a key 14e is provided for controlling the windshield-wipers. Advantageously, said key is also a reduced-scale reproduction of such a wiper and can assume a plurality of control positions by pivoting about an end pivot pin. For each position, the key determines the operation of the windshield-wipers, as selected by the driver, such as stop, intermittent wiping, slow wiping, quick wiping.

On the roof is provided a key 14f controlling the horn, as well as the key 14g controlling the lighting inside the vehicle.

On each door are provided keys 14h controlling the window-regulator. Said keys may be of a conventional type with one stable rest position in the middle and two non-stable switcing positions on either side of said middle position, or of a type with cursor permitting the control of the windows in any predetermined position between a closed position and an open position.

On the rear window are provided, on the one hand, a key 14*i* controlling the demisting/defrosting system, and on the other hand, keys 14*j* and 14*k* controlling the rear window wiper and washer.

Finally, at the rear end of the boot are provided a key 14*l* controlling the emergency lights and key 14*m* controlling an extra indicator-rear light called "fog light".

Obviously, the foregoing list is in not way restrictive and the number of keys may be adapted to the number of equipments with which the vehicle is equipped.

Likewise, in the foregoing, the use of the term "reproduction" to characterize the shape of the support, is not limited to a simple homothetic reproduction of the actual vehicle.

In particular, it can be of low relief, namely such that the scale reduction of certain dimensions, such as for example the vertical dimensions of the vehicle will be accentuated with respect to the scale reduction of the horizontal dimensions. Understandably, the parts in relief must be sufficiently defined to be recognized by a simple touch of the fingers. Moreover, it is also possible to change to a certain extent the shapes of the vehicle, such as for example, to incline the vertical surfaces, or to accentuate or reduce the inclination of certain surfaces, or to modify the respective proportions of the different parts.

It is in that sense that the expression "near-reproduction" used in the introductory part of the description and in the claims should be interpreted.

Moreover, said reproduction or near-reproduction may have an aspect specific of the actual vehicle in which it is to be mounted, and it may be inspired by the shapes and proportions of the vehicle model; or it may be given a generic design for all the types of vehicle of one family and have the shapes and proportions of "one vehicle" selected as archetype of the family, such as two-person motorcar, or three-person motorcar, station wagon, van, bus, truck.

The invention is in no way limited to land vehicles and can also be applied to aircrafts and boats.

In addition, the position of every key does not necessarily correspond to the exact position of the equipment it controls. For example, the key controlling the two headlights, can quite well consist of a single key as long as it is situated at the front of the bonnet. For the indicator lights, the keys will be placed in reasonable logical parts for the corresponding function: the keys to signal on the right and left turns are placed on the right and left sides, respectively, of the support.

Figure 2:
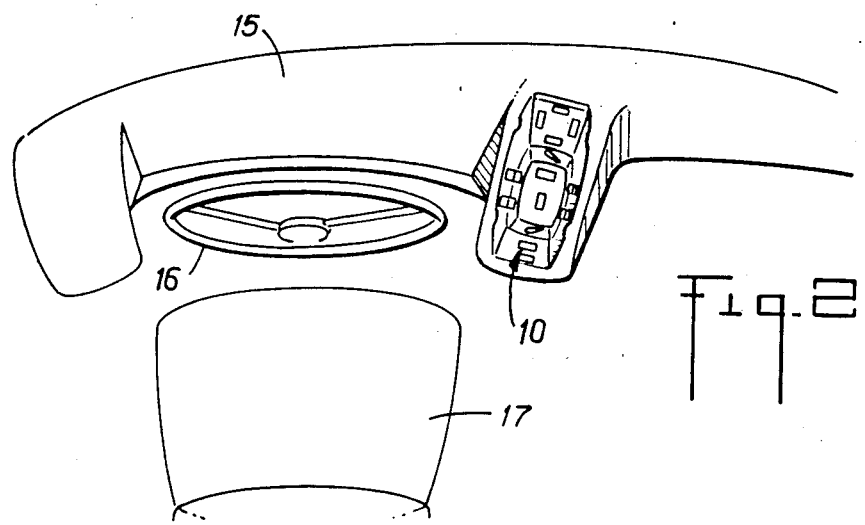
FIG. 2 is a diagrammatical view of a motor-vehicle driver's area, incorporating a device according to the invention.

According to the example illustrated in FIG. 2, the keyboard 10 is mounted in the actual vehicle on dashboard 15, close to the steeringwheel 16 and within reach of the driver seated in a normal driving position on seats 17. The keyboard is mounted via a bracket which houses the wires connecting the keys to the source of electric power.

It is noted that, when the driver is desirous to actuate one of the equipments of his vehicle, all he needs to do is to place his hand, for example his right hand, on the support, and by simple tactile recognition, to reach the corresponding key with one finger and press it.

Unquestionably, the invention observes all the conditions of safe driving, since the driver can keep this eyes on the road while controlling the different equipments.

In addition, there is virtually no need to learn the position of the keys, which is a great advantage for beginners, or for drivers changing vehicles.

It is on the other hand possible to further reinforce the tactile recognition of the keys by affixing thereon conventionally chosen raised designs, such as for example, a triangle for emergency lights.

Figure 3:
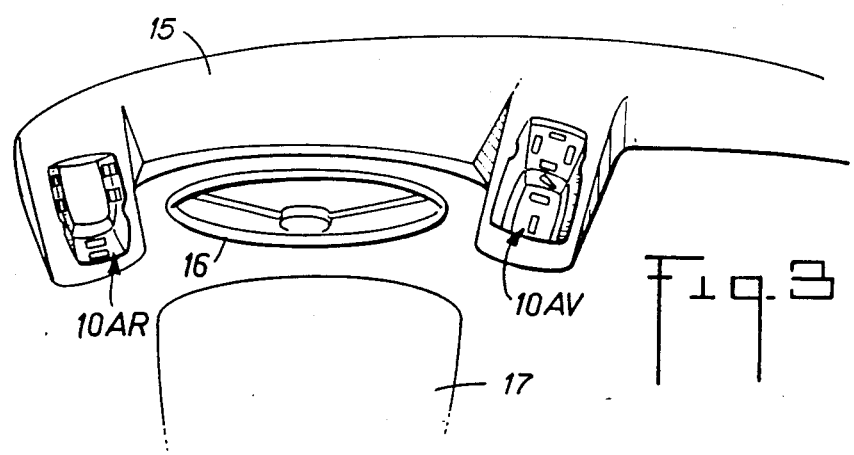
FIG. 3 illustrates a variant according to which two partial devices are used, one for the front part of the vehicle and the other for the rear part.

According to the variant illustrated in FIG. 3, the keyboard is split into two separate parts forming two partial keyboards 10AV and 10AR placed on dashboard 15, on the left and right of the steering wheel respectively so as to divide the controls of the different instruments between the two hands of the driver. Advantageously, the keyboard part situated on the right comprises the front half of the vehicle, namely the keys operating the headlights, the indicators, the windshield wipers and washers and the horn, and the keyboard part situated on the left comprises the rear half of the vehicle, namely the keys operating the window-regulators, the inside lighting, the back window-wiper and washer, the demisting/defrosting system, the emergency lights and fog lights.

When the keys are mechanical-type keys, they are their own indicators of position, both on a visual and on a tactile point of view. It will also be possible, as a complement, to provide the keys or at least some of the keys, with light or sound indicators of operation. This last feature will be particularly advantageous in the case of touch-type keys.

Whatever the system selected, namely one keyboard or several keyboard parts, the bracket on which it is mounted may be designed to be retractable in order to make it easy for the driver to go in and out of the vehicle, and to free his movements when the vehicle is stopped.

FIG. 4 illustrates a conventional wiring diagram between the keys of keyboard 10, the source 18 of electrical power on the vehicle, and articles of equipment, schematically illustrated at 20*a* and 20*b* for example, controlled by the keys of the keyboard. Accordingly to this diagram, each key is individually connected to the equipment that it controls. The cable assembly thus forms a bundle branching from the device to the different equipments.

Advantageously, the keyboard comprises a base, designed so as to be secured in a selected part of the vehicle and an electrical connector 22 is interposed between the electrical cables issuing from the different keys and the start of the bundle. It is also possible to arrange for the base to be removably secured and for the connector to be removable.

This particular arrangement offers multiple advantages, among which:

first of all, the keyboard forms a set, together with its base and its connector, the production of which does not interfere with the assembly of the wiring bundle and with the different assembling steps, of the vehicle, which set can be tested separately on particularly simple test stations; a manufacturer producing various types of motorcars can use the same keyboard for all of them, the difference in the wiring bundles concerning only the part of the bundle situated between the connector and the equipments;

secondly, the diagnosis and repair of breakdowns occurring in the keyboard can easily be performed out of the vehicle, the whole keyboard and its cables of connection to the connector being readily replaceable, especially while the vehicle is under guarantee or if the users are in urgent need;

thirdly, and considering the different equipments offered on option by the manufacturers, it will be particularly easy to organize the supply to the concerned stations in an assembly line, of keyboards optionally provided with the keys corresponding to such optional equipments.

The wiring diagram illlustrated in FIG. 5 is particularly designed for multiplex installations. If this technique is adopted, there is no power supply connection to the keys and the electric connection of the keyboard is limited to the connection of control bus 24 and survey bus 26, namely electric wires of very small section and in very limited number for conveying very low power digital or analog signals. Advantageously, the microprocessor 28 associated with this type of installation will be integrated in the keyboard support.

Figure 6:
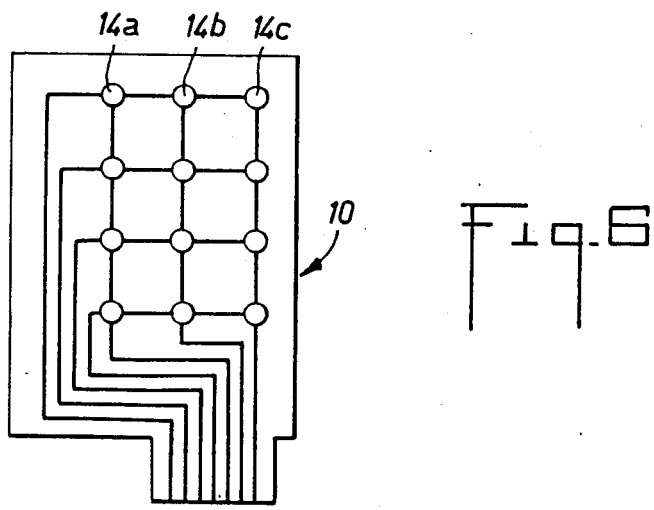

The keys may be individually connected to the microprocessor, or they may be wired according to a matrix system, such as diagrammatically illustrated in FIG. 6, in which case the microprocessor will be programmed in known manner to recognize the state of the different keys.

Finally, it will be possible to incorporate in the keyboard according to the invention a neutralization code device.

In order to prevent entangling of the electric wires inside the support between the keys and the calculator, said electric wires can be produced in the form of conductor tracks running along the inner surface of the support. To this effect, one advantageous solution consists in producing the support, first of all, in the form of a flat printed circuit board, thereafter giving to said board the desired raised form, for example by stamping; the board substrate will be produced from a material compatible with the selected shaping method, and the printed circuit tracks will be produced from a ductile metal enabling them to follow the deformations of the board without tearing. The keys are then fixed on the support by an suitable method and their electric terminations are connected to the conducting tracks by welding or by tight contact.

Figure 7:
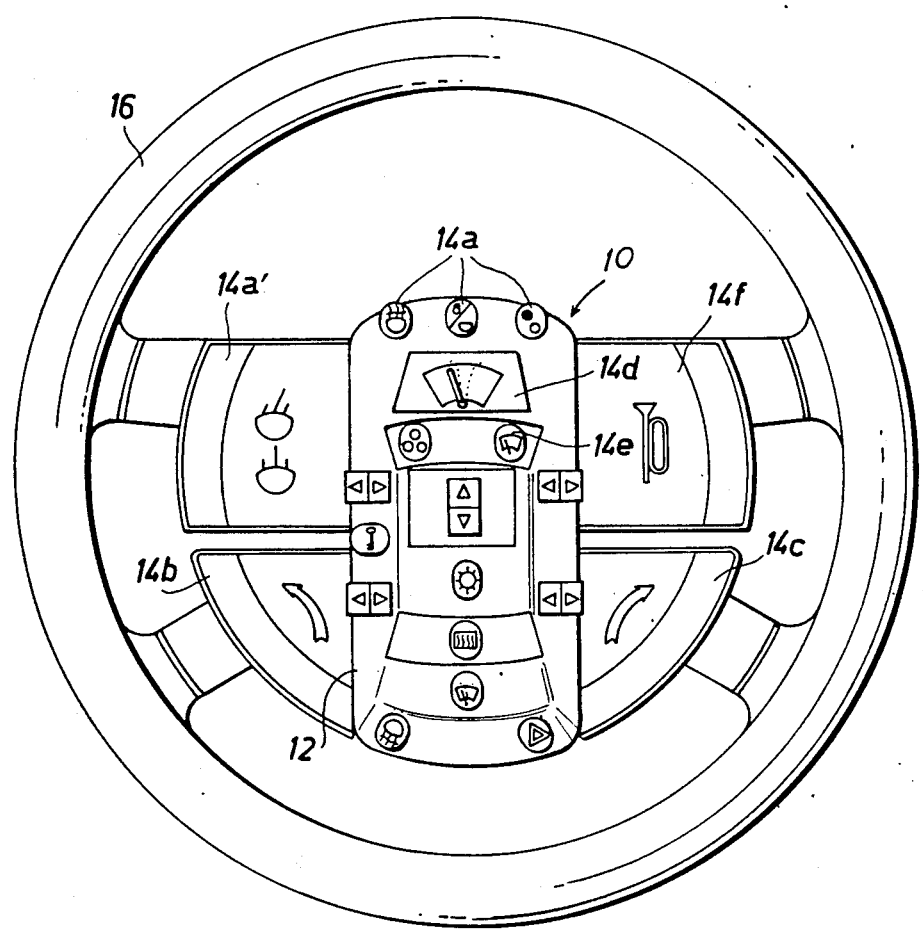
FIG. 7 illustrates a variant in which the device is implanted in the center of the steering-wheel.

According to the arrangement illustrated in FIG. 7, the keyboard is mounted at the center of the steering wheel 16 of the vehicle, which permits an extremely quick access with either hand equally. Obviously, the keyboard is installed in such a way that it remains stationary with respect to the actual vehicle, irrespective of the angular position of the steering wheel, by means of any device suitable to this end.

In this variant, some keys (14a', 14b, 14c, 14f) which correspond to emergency equipments are so mounted as to be accessed directly by the driver without removing his or her hands from the steering wheel 16.

As illustrated, these keys comprise actuating levers which extend radially from the keyboard towards the outer edge of the steering wheel, in such a way that they can be actuated by the fingers without taking the hands off the steering wheel.

An advantage of this embodiment is that the electric or electronic part of these "emergency" keys is also borne by the keyboard itself, which avoids the need to install electrical connections to these keys.

By way of non-restrictive example, these "emergency" keys can be:
the "horn" key 14f
the "indicator" keys 14b, 14c
the "headlight" key 14a'.

According to a last feature, not shown, the keys, or at least some of them, can be arranged at the bottom of shallow recesses in order not to protrude above the keyboard support. In this manner, undesired actuation of the keys is avoided when the keyboard is hit by a portion of the driver's body other than his fingers, such as his elbows or arms.

What is claimed is:

1. A switch assembly for an automotive vehicle, comprising:
   a support having a shape that is substantially a reduced scale three dimensional reproduction of at least a portion of a vehicle, the support including a multitude of surfaces substantially geometrically corresponding to outside surfaces of a vehicle and mutually arranged to allow tactile recognition and identification of the surfaces of the support corresponding to outside surfaces of the vehicle;
   means connected to the support for mounting the support on the vehicle; and
   a plurality of switches mounted on the support, each switch for controlling the actuation and deactuation of one of a plurality of articles of equipment of the vehicle, and each switch being positioned on the support on a location substantially corresponding to the location of said one article of equipment on the vehicle.

2. A switch assembly according to claim 1, wherein the support is in a low relief form.

3. A switch assembly according to claim 1, wherein:
   the vehicle includes first and second halves;
   the support includes first and second separate parts;
   the first part of the support is a reduced scale three dimensional reproduction of the first half of the vehicle; and
   the second part of the support is a reduced scale three dimensional reproduction of the second half of the vehicle.

4. A switch assembly according to claim 3, wherein:
   said first half is a front half of the vehicle; and
   said second half is a rear half of the vehicle.

5. A switch assembly according to claim 1, wherein at least one of the switches is a reduced scale three dimensional reproduction of the article of equipment controlled by said one switch.

6. A switch assembly according to claim 1, wherein at least one of the switches includes a raised design to facilitate tactile recognition of the one switch.

7. A switch assembly according to claim 1, wherein at least one of the switches includes means to indicate the state of the article of equipment controlled by the one switch.

8. A switch assembly according to claim 1, wherein the switches are electrically connected to a microprocessor, said microprocessor electrically connecting the switches to a multiplex circuit.

9. A switch assembly according to claim 1, wherein the switches are electrically connected together in a matrix system.

10. A switch assembly according to claim 1, wherein the automotive vehicle includes an electrical system, and the switch assembly further includes an electric connector to connect the switch assembly electrically to said electrical system.

11. A switch assembly according to claim 1, wherein the means for mounting the support on the vehicle includes a retractable bracket.

12. A switch assembly according to claim 1, wherein the automotive vehicle includes a steering wheel having a central hub, and the switch assembly is mounted on said hub.

13. A switch assembly according to claim 12, wherein at least one of the switches extends radially outward, away from the hub.

14. A switch assembly according to claim 1, wherein:
- at least one of the surfaces of the support defines a plane, and a recess extending inward from said plane; and
- at least one of the switches is located in said recess and does not project through said plane.

15. A switch assembly for an automotive vehicle, comprising:
- a support having a shape that is a reduced scale three dimensional reproduction of at least a portion of a vehicle, the support including a multitude of surfaces geometrically substantially corresponding to a roof, windshield, bonnet, front and two lateral side surfaces of the vehicle, the surfaces of the support being mutually arranged to allow tactile recognition and identification of the surfaces of the support corresponding to surfaces of the vehicle;
- means connected to the support for mounting the support on the vehicle; and
- a plurality of switches mounted on the support, each switch controlling the actuation and deactuation of one of a plurality of articles of equipment of the vehicle, and each switch being positioned on the support on a location corresponding to the location of said one article of equipment on the vehicle.

16. A switch assembly for a selected automotive vehicle having a plurality of surfaces and a plurality of articles of equipment, the switch assembly comprising:
- a support having a shape that is a reduced scale three dimensional reproduction of at least a portion of the outside of a chosen vehicle also having a plurality of outside surfaces, the support including a multitude of outside surfaces geometrically corresponding to the outside surfaces of the chosen vehicle and generally corresponding to the outside surfaces of the selected automotive vehicle, the outside surfaces of the support being arranged to allow tactile recognition and identification of the surfaces of the support corresponding to the outside surfaces of the selected vehicle;
- means connected to the support for mounting the support on the selected vehicle; and
- a plurality of switches mounted on the support to actuate and deactuate the articles of equipment;
- each switch controlling the actuation and deactuation of one article of equipment, and the switch being positioned on the support at a location corresponding to the location of said one article of equipment on the selected vehicle.

* * * * *